United States Patent [19]
Nadayoshi et al.

[11] Patent Number: 5,690,581
[45] Date of Patent: Nov. 25, 1997

[54] CONTROL SYSTEM FOR AUTOMATIC TRANSMISSION

[75] Inventors: Kaoru Nadayoshi, Anjo; Hiroshi Tsutsui; Yoshihisa Yamamoto, both of Nishio; Masahiro Hayabuchi, Anjo, all of Japan

[73] Assignee: Aisin Aw Co., Ltd., Japan

[21] Appl. No.: 645,959

[22] Filed: May 10, 1996

[30] Foreign Application Priority Data

May 12, 1995 [JP] Japan .................................... 7-115010

[51] Int. Cl.$^6$ .................................................. B60K 41/02
[52] U.S. Cl. ........................ 477/176; 477/155; 477/180
[58] Field of Search ..................................... 477/143, 155, 477/180, 902, 156, 174, 175, 176, 70

[56] References Cited

U.S. PATENT DOCUMENTS

| | | | |
|---|---|---|---|
| 4,331,226 | 5/1982 | Heidemeyer et al. | 477/175 |
| 4,611,507 | 9/1986 | Burkel et al. | |
| 4,632,231 | 12/1986 | Hattori et al. | 477/175 |
| 4,718,525 | 1/1988 | Yamaguchi et al. | 192/0.052 |
| 5,050,714 | 9/1991 | Kurihara et al. | 477/176 |
| 5,056,639 | 10/1991 | Petzold et al. | 477/176 |
| 5,275,267 | 1/1994 | Slicker | 477/176 |
| 5,301,572 | 4/1994 | Tanaka et al. | |
| 5,343,782 | 9/1994 | Jamzadeh | 477/156 |

FOREIGN PATENT DOCUMENTS

| | | |
|---|---|---|
| 479349 | 4/1992 | European Pat. Off. |
| 588443 | 3/1994 | European Pat. Off. |
| 249839 | 11/1986 | Japan |

OTHER PUBLICATIONS

Patent Abstracts of Japan; vol. 016, No. 529 Oct. 29, 1992 194451, Jul. 14, 1992.

*Primary Examiner*—Charles A. Marmor
*Assistant Examiner*—Sherry Lynn Estremsky
*Attorney, Agent, or Firm*—Lorusso & Loud

[57] ABSTRACT

A control system for an automatic transmission includes a clutch for transmitting the rotation of an engine to the transmission and a hydraulic servo for applying/releasing the clutch. A starting state is determined by satisfaction of at least one of the following conditions: the throttle opening is not fully closed; the brake pedal is released; and/or the vehicle speed is substantially above zero. Sensors detect the throttle opening of the engine and the applied/released state of the clutch and send signals to a control unit. A hydraulic controller controls the oil pressure fed to the hydraulic servo. When the starting state is detected, the control unit detects the actual applied/released state of the clutch to determine the difference between the applied/released state and a predetermined ideal applied/released state to set an oil pressure correction according to that difference. Next, a predetermined oil pressure for achieving the ideal engaging characteristics of the clutch is read, oil pressure correction is added to the read oil pressure, and the sum is output to the hydraulic controller. As a result, even if an error occurs in the output of the control valve of the hydraulic controller or if the clutch has aged, the oil pressure is corrected by the oil pressure correction according to the difference between the actual applied/released state and the ideal applied/released state so that the engaging characteristics obtained can approximate the ideal.

5 Claims, 10 Drawing Sheets

FIG. 3

|  | Clutch | | | Brake | | | | One-Way Clutch | | |
|---|---|---|---|---|---|---|---|---|---|---|
|  | C1 | C2 | C3 | B1 | B2 | B3 | B4 | F1 | F2 | F3 |
| R | × | ○ | × | × | × | ○ | ○ | × | × | × |
| N | × | × | × | × | × | × | ○ | × | × | × |
| D 1ST | ○ | × | × | × | × | (○) | ○ | × | ○ | ○ |
| D 2ND | ○ | × | × | ○ | ○ | × | ○ | ○ | × | ○ |
| D 3RD | ○ | × | ○ | ○ | ○ | × | × | ○ | × | × |
| D 4TH | ○ | ○ | ○ | × | ○ | × | × | × | × | × |

CONTROL SYSTEM FOR AUTOMATIC TRANSMISSION

BACKGROUND OF THE INVENTION

1. Field of the Invention

The present invention relates to a control system for an automatic transmission and, more particularly, to an automatic transmission control system for achieving ideal engaging characteristics in a clutch and preventing racing of the engine and application shock of the clutch.

2. Related Art

In the automatic transmission of the prior art, the rotation of the engine is transmitted to a speed change unit through a fluid transmission, such as a torque converter, so that its speed is changed by the speed change unit. Between the fluid transmission and the speed change unit, there is arranged a first clutch (or input clutch) which is engaged to start the vehicle in motion.

When a starting operation, for starting the vehicle in motion, is performed by depressing the accelerator pedal, the first clutch is applied. At this time, the oil pressure fed to the hydraulic servo of the first clutch is controlled on the basis of the values corresponding to the engine torque, such as the engine RPM or the throttle opening, so that the first clutch may engage in conformance with ideal engaging characteristics, to thereby prevent racing of the engine and application shock (as disclosed in Japanese Patent Laid-Open No. 249839/1986).

In the control system for an automatic transmission of the prior art, however, the ideal engaging characteristics are difficult to achieve in practice, if an error occurs in the output of a control valve for generating the oil pressure or because of aging of the first clutch.

It is conceivable that feedback control might be utilized by setting ideal change characteristics in parameters indicating the applied/released state of the first clutch and by detecting the actual parameters so that deviation of the detected parameters from the parameters setting the ideal change characteristics may be compensated for and kept small.

If the control gain is enlarged, the follow-up can be improved even if the aforementioned error is large, but the oil pressure will seriously fluctuate and provide poor convergence.

If the control gain is reduced, on the other hand, the convergence is improved but the follow-up becomes poor making it difficult to achieve the ideal engaging characteristics.

SUMMARY OF THE INVENTION

The present invention has as its object solution of the aforementioned problems of the prior art control systems and provision of a control system for an automatic transmission which can achieve ideal engaging characteristics for a clutch to prevent engine racing and application shock.

According to one aspect of the present invention, therefore, there is provided a control system for an automatic transmission, including: a clutch for transmitting the rotation of the engine to the transmission mechanism of a speed change unit; a hydraulic servo for applying/releasing the clutch; and starting state detecting means for detecting an operation to start the vehicle in motion, as satisfaction of at least one of the following conditions: that the throttle opening is not fully closed, that the brake pedal is released and that the vehicle speed is not substantially zero. The control system further includes: throttle opening detecting means for detecting the throttle opening of the engine; applied/released state detecting means for detecting the applied/released state of the clutch; hydraulic control means for controlling the oil pressure fed to the hydraulic servo; and a control unit.

The control unit, in turn, includes: characteristic storing means containing engagement characteristic data correlated with oil pressure for achieving the ideal engaging characteristics for the clutch, in accordance with elapsed time and throttle opening; applied/released state characteristic storing means containing applied/released parameters of the clutch corresponding to the ideal engaging characteristics, in accordance with elapsed time and throttle opening; correction setting means for setting an oil pressure correction (pressure increment) according to the determined difference between the actual applied/released state of the clutch, as detected by the applied/released state detecting means, and the ideal applied/released state, as read out from the applied/released state characteristic storing means; and hydraulic command means for reading out the oil pressure from the characteristic storing means, if the vehicle starting state is detected, and for adding the oil pressure correction to the read oil pressure.

If any one of the following conditions is satisfied: the throttle is not fully closed; the brake pedal is released; and the vehicle is in motion, i.e. the vehicle speed is not substantially zero, the starting state detecting means determines the vehicle starting state.

Moreover, the control unit detects the actual applied/released state of the clutch and determines the difference between the applied/released state and the ideal applied/released state, as read out from the applied/released state characteristics storing means, to thereby set the oil pressure correction in accordance with that difference.

Next, the control unit read outs the oil pressure for achieving the ideal engaging characteristics of the clutch from the characteristics storing means, adds the oil pressure correction to the read oil pressure and outputs the sum to the hydraulic control means.

Even if an error occurs in the output of the control valve of the hydraulic control means or if the clutch has aged, the oil pressure is corrected by the oil pressure correction according to the difference between the actual applied/released state and the ideal applied/released state so that the engaging characteristics obtained approximate the ideal ones. As a result, it is possible to prevent racing of the engine and application shock.

With the characteristic storing means being stored with the ideal engaging characteristics of the clutch, moreover, the difference between the ideal engaging characteristics and the actual engaging characteristics can be minimized. This makes it possible to set the oil pressure correction at a low value and to improve the follow-up and the convergence.

According to another aspect of the present invention, the applied/released state of the clutch is detected in terms of an engine RPM by the applied/released state detecting means, and the applied/released state characteristic storing means contains engine RPM data corresponding to the ideal applied/released state, which data may be in the form of elapsed time correlated with throttle opening. In this case, it is possible to detect the applied/released state of the clutch easily and to improve the controllability.

In still another control system for an automatic transmission of the present invention, furthermore, the control unit includes: stop state detecting means for detecting the vehicle stop state in which a forward running range is selected, in which the throttle opening is fully closed, in which the brake pedal is depressed and in which the vehicle speed is substantially zero; and stop oil pressure generating means for generating a stop oil pressure immediately before the clutch starts its engagement, if the vehicle stop state is detected.

Moreover, the hydraulic command means reads out the oil pressure from the characteristic storing means, if the vehicle starting state is detected, and adds the stop oil pressure to the read oil pressure.

In this case, a shift can be made from the vehicle stop state to the vehicle starting state so that a neutral control can be performed.

In still another aspect of the present invention, the control unit further includes: stop state detecting means for determining a vehicle "stop state" based on satisfaction of all of the following conditions: the forward running range is selected, the throttle opening is fully closed, the brake pedal is depressed and the vehicle speed is substantially zero; and stop oil pressure generating means for generating a stop oil pressure to hold the clutch in the state which immediately precedes the start of its engagement, if the vehicle stop state is detected. The hydraulic command means reads out the oil pressure from the characteristic storing means, if the vehicle starting state is detected, adds the stop oil pressure to the read oil pressure and outputs the sum to the hydraulic control means.

In the neutral control, the clutch is held in the state immediately before the start of engagement, so that the piston of the hydraulic servo is placed in a slightly retracted position. If the oil pressure is raised from this state, the piston is prevented from quick movement by starting resistance. If, in this condition, the vehicle starting state is detected, first the oil pressure is read out from the characteristic storing means, and the initial engaging pressure is added to the read oil pressure. This sum is then output to the hydraulic control means so that the piston can be moved against the starting resistance. This makes it possible to shorten the application time.

In a preferred embodiment the correction setting means sets the oil pressure correction to zero if the difference between the actual applied/released state and the ideal applied/released state is smaller than a set value. This feature serves to prevent the oil pressure to be fed to the hydraulic servo from slightly fluctuating when the oil pressure correction is added.

In a further aspect of the present invention, the control unit may further include, in combination with the stop state detecting means and stop oil pressure generating means, initial engaging pressure generating means for generating an initial engaging pressure. In this case, the hydraulic command means reads out the oil pressure from the characteristic storing means, if the vehicle starting state is detected, adds the stop oil pressure to the read oil pressure and then outputs the sum to the hydraulic control means.

In a further aspect of the present invention, furthermore, the correction setting means sets the oil pressure correction to zero if the difference between the actual applied/released state and the ideal applied/released state is smaller than a set value.

BRIEF DESCRIPTION OF THE DRAWINGS

FIG. 3 is a table of the operations of the automatic transmission in the embodiment of FIGS. 1 and 2;

DESCRIPTION OF THE PREFERRED EMBODIMENT

An embodiment of the present invention will now be described in detail with reference to the accompanying drawings.

Figure 1:
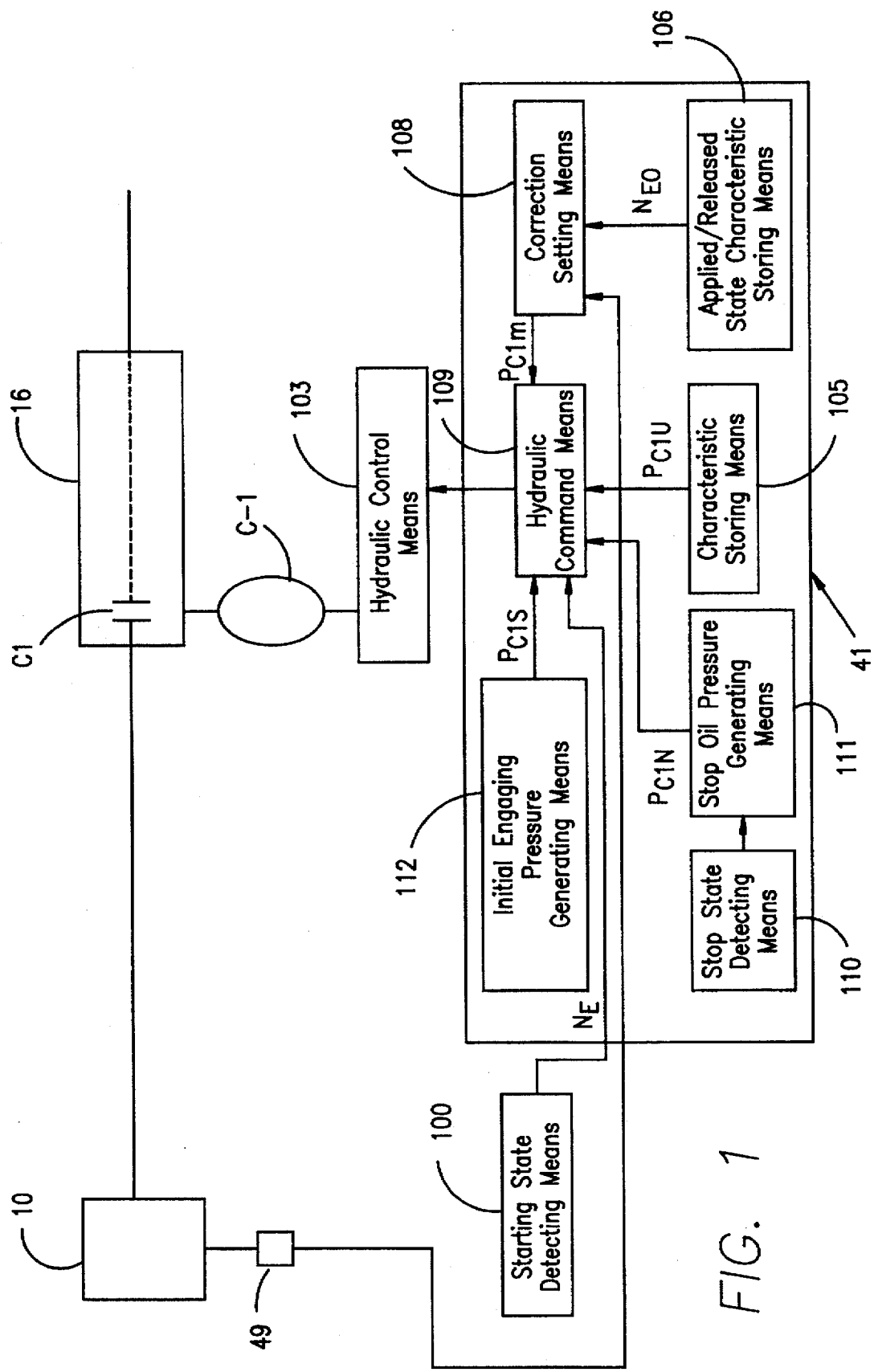
FIG. 1 is a block diagram of a control system for an automatic transmission in accordance with one embodiment of the present invention.

In FIG. 1: reference numeral 10 designates an engine; C1 is a first clutch, applied responsive to selection of a forward running range, for transmitting the rotation of the engine 10 to a transmission mechanism of a speed change unit 16; C-1 is a hydraulic servo for applying/releasing the first clutch C1; and 100 designates starting state detecting means for detecting a vehicle starting state as satisfaction of at least one of the following conditions: throttle opening θ is not fully closed, the brake pedal is released and the vehicle speed is not substantially zero.

An engine RPM sensor 49 acts as applied/released state detecting means for detecting the applied/released state of the first clutch C1 as an engine RPM $N_E$. Hydraulic control means 103 controls C-1 oil pressure $P_{C1}$ fed to the hydraulic servo C-1.

An automatic transmission control unit 41 serves as the control system in this embodiment and is provided with characteristic storing means 105 containing sweep-up pressure $P_{C1U}$ data for achieving the ideal engaging characteristics for the first clutch C1, in accordance with the elapsed time and the throttle opening θ; and applied/released state characteristic storing means 106 containing engine RPM $N_{EO}$ data indicating the applied/released state of the first clutch C1 if the ideal engaging characteristics are achieved, in accordance with the elapsed time T and the throttle opening θ. Correction setting means 108, also included in the control unit 41, determines the difference between the engine RPM $N_E$, which is detected by the engine RPM sensor 49 and indicates the actual applied/released state of the first clutch C1, and the engine RPM $N_{EO}$, which is read out from the applied/released state storing means 106 and indicates the ideal applied/released state, and sets an oil pressure correction $P_{C1m}$ in accordance with that difference. Hydraulic command means 109 reads out the sweep-up pressure $P_{C1P}$ from the characteristic storing means 105, if the vehicle starting state is detected, and adds the oil pressure correction $P_{C1m}$ to the sweep-up pressure $P_{C1u}$.

As also shown in FIG. 1, the control unit 41 further includes: stop state detecting means 110 for detecting the "vehicle stop state" in which a forward running range is selected, in which the throttle is fully closed, in which the brake pedal is depressed and in which the vehicle speed is substantially zero; and stop oil pressure generating means 111 for generating a stop oil pressure to hold the clutch in the state which precedes the start of its engagement, responsive to detection of the vehicle stop state. The hydraulic command means 109 reads out the oil pressure from the characteristic storing means 105, if the vehicle starting state is detected, and adds the stop oil pressure to the read oil pressure.

As also further shown in FIG. 1, the control unit 41 of the depicted embodiment further includes initial engaging pressure generating means 112 for generating an initial engaging pressure. In this case, the hydraulic command means 109 reads out the oil pressure from the characteristic storing means 105, if the vehicle starting state is detected, adds the stop oil pressure and the initial engaging pressure to the read oil pressure and then outputs the sum to the hydraulic control means 103.

Figure 2:
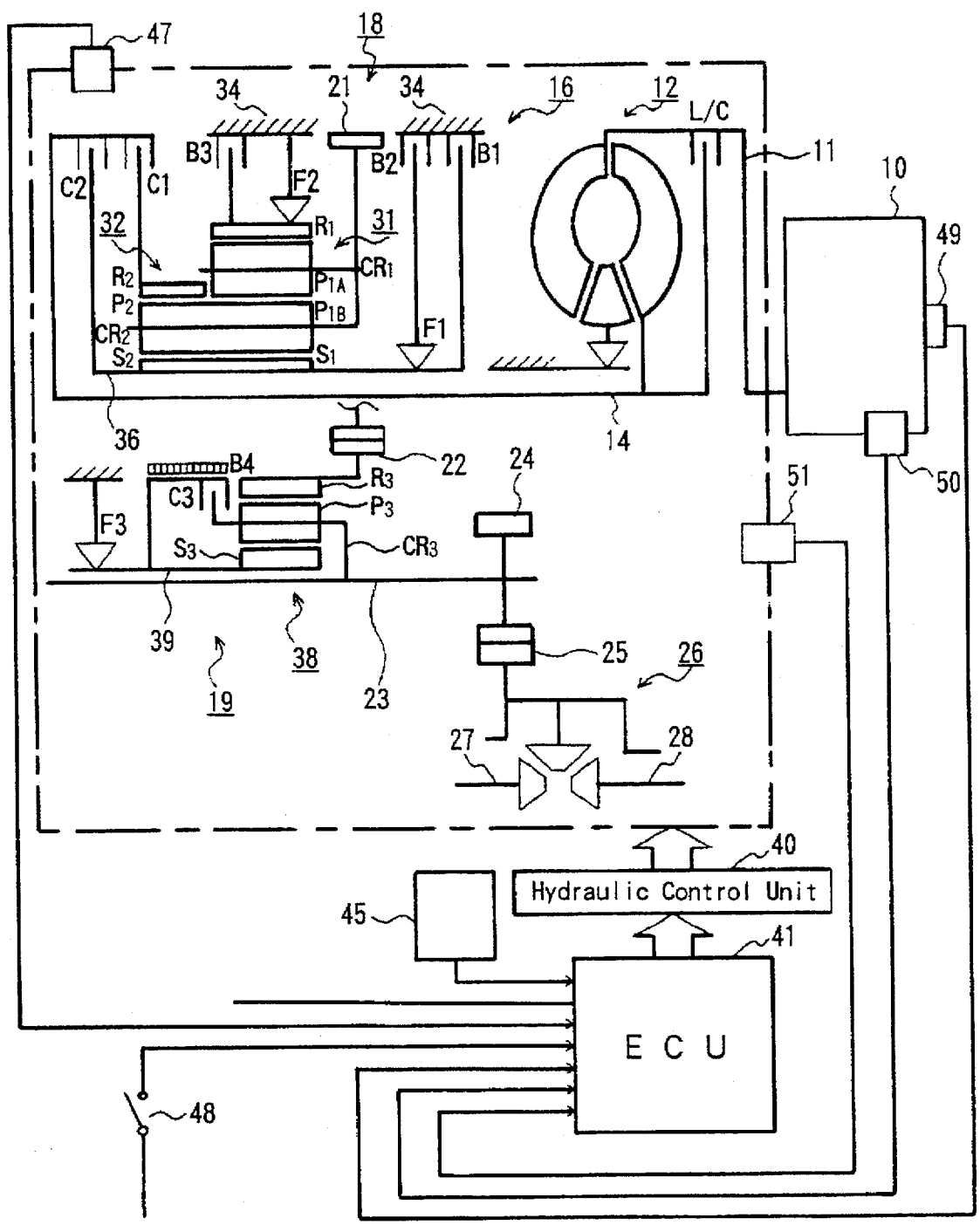
FIG. 2 is a schematic diagram of the automatic transmission in the embodiment of FIG. 1.

As shown in FIG. 2, the rotation generated by the engine 10 is transmitted through an output shaft 11 to the torque converter 12. Torque converter 12 transmits the rotation of the engine 10 to an output shaft 14 through a fluid (or working oil) or transmits the rotation directly to the output shaft 14 when the vehicle speed exceeds a predetermined value, by application of a lockup clutch L/C.

The output shaft 14 inputs rotation to the speed change unit 16 for establishing four forward and one reverse speeds. This speed change unit 16 includes a main transmission 18 for establishing three forward and one reverse speeds and an under-drive auxiliary transmission 19. The rotation of the main transmission 18 is transmitted through a counter drive gear 21 and a counter-driven gear 22 to the auxiliary transmission 19, and the rotation of the output shaft 23 of the auxiliary transmission 19 is transmitted through an output gear 24 and a ring gear 25 to a differential mechanism 26.

In this differential mechanism 26, the rotation, as received through the output gear 24 and the ring gear 25, is differentiated so that the differential rotations are transmitted through left-hand and right-hand drive shafts 27 and 28 to the not-shown drive wheels.

The main transmission 18 is equipped with a first planetary gear unit 31, a second planetary gear unit 32, the first clutch clutch C1, a second clutch C2, a first brake B1, a second brake B2, a third brake B3 and one-way clutches F1 and F2 for transmitting the torque selectively between the individual elements of the two planetary gear units 31 and 32. The first clutch C1 functions as an input clutch for transmitting the rotation from the torque converter 12 to the transmission mechanism which includes the remaining elements of the first main transmission 18 and the auxiliary transmission 19.

The first planetary gear unit 31 is composed of: a ring gear $R_1$ connected to a drive unit casing 34, through the third brake B3 and the one-way clutch F2, which are arranged in parallel with each other; a sun gear $S_1$ formed on a sun gear shaft 36 fitted on and rotatably supported by the output shaft 14; a carrier $CR_1$ connected to the counter drive gear 21; and pinions $P_{1A}$ and $P_{1B}$ meshing between the ring gear $R_1$ and the sun gear $S_1$ and rotatably supported by the carrier $CR_1$.

The sun gear shaft 36 is connected through the second clutch C2 to the output shaft 14. The sun gear shaft 36 is further connected through the first brake B1 to the drive unit casing 34 and through the one-way clutch F1 and the second brake B2, as arranged in series, to the drive unit casing 34.

On the other hand, the second planetary gear unit 32 is composed of: a ring gear $R_2$ connected through the first clutch C1 to the output shaft 14; a sun gear $S_2$ formed on the sun gear shaft 36 integrally with the sun gear $S_1$; a carrier $CR_2$ connected to the carrier $CR_1$; and a pinion $P_2$ meshing between the ring gear $R_2$ and the sun gear $S_2$, rotatably supported by the carrier $CR_2$ and formed integrally with the pinion $P_{1B}$.

Moreover, the counter drive gear 21 meshes with the counter driven gear 22 in the auxiliary transmission 19, to transmit the rotation, at the speed established by the main transmission 18, to the auxiliary transmission 19.

The auxiliary transmission 19 is equipped with a third planetary gear unit 38 and with a third clutch C3, a fourth brake B4 and a one-way clutch F3 for transmitting the torque selectively between the individual elements of the third planetary gear unit 38.

The third planetary gear unit 38 is composed of: a ring gear $R_3$ connected to the counter driven gear 22; a sun gear $S_3$ formed on a sun gear shaft 39 rotatably fitted on the output shaft 23; a carrier $CR_3$ fixed on the output shaft 23; and a pinion $P_3$ meshing between the ring gear $R_3$ and the sun gear $S_1$ and rotatably supported by the carrier $CR_3$.

The operations of the automatic transmission having the construction thus far described will now be described with reference to FIG. 3. Incidentally, in FIG. 3: C1 designates the first clutch; C2 the second clutch; C3 the third clutch; B1 the first brake; B2 the second brake; B3 the third brake; B4 the fourth brake; and F1 to F3 the one-way clutches. Moreover: R designates a reverse running range; N an N-range; D a forward running range (hereinafter "D-range"); 1ST a 1st-speed gear stage; 2ND a 2nd-speed gear stage; 3RD a 3rd-speed gear stage; and 4TH a 4th-speed gear stage.

Moreover, symbol O indicates that the first clutch C1, the second clutch C2, the third clutch C3, the first brake B1, the second brake B2, the third brake B3 and the fourth brake B4 are applied, and that the one-way clutches F1 to F3 are locked. On the other hand, symbol X indicates that the first clutch C1, the second clutch C2, the third clutch C3, the first brake B1, the second brake B2, the third brake B3 and the fourth brake B4 are released, and that the one-way clutches F1 to F3 are free. Symbol (O) indicates that the third brake B3 is applied for engine braking.

At the 1st speed in the D-range, the first clutch C1 and the fourth brake B4 are applied to lock the one-way clutches F2 and F3. Then, the rotation of the output shaft 14 is transmitted through the first clutch C1 to the ring gear $R_2$. In this state, the rotation of the ring gear $R_1$ is blocked by the one-way clutch F2 so that the rotation of the carrier $CR_2$ is drastically decelerated and transmitted to the counter driven gear 21 while B rotating the sun gear $S_2$ at idle.

The rotation, as transmitted from the counter drive gear 21 to the counter driven gear 22, is transmitted to the ring gear $R_3$. However, the rotation of the sun gear $S_3$ is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are applied to lock the one-way clutches F1 and F3. Then, the rotation of the output shaft 14 is transmitted through the first clutch C1 to the ring gear $R_2$. The rotation of this ring gear $R_2$ is decelerated and transmitted to the carrier $CR_2$, because the rotation of the sun gear $S_2$ is blocked by the second brake B2 and the one-way clutch F1. The rotation of the carrier $CR_2$ is transmitted to the counter drive gear 21 while rotating the ring gear $R_1$ at idle.

The rotation, as transmitted from the counter drive gear 21 to the counter driven gear 22, is then transmitted to the ring gear $R_3$. However, the rotation of the sun gear $S_3$ is blocked by the fourth brake B4 so that the rotation of the carrier $CR_3$ is decelerated and transmitted to the output shaft 23.

Next, at the 3rd speed in the D-range, the first clutch C1, the third clutch C3, the first brake B1 and the second brake B2 are applied to lock the one-way clutch F1. Then, the rotation of the output shaft 14 is transmitted through the first clutch C1 to the ring gear $R_2$. The rotation of this ring gear $R_2$ is decelerated and transmitted to the carrier $CR_2$ because the rotation of the sun gear $S_2$ is blocked by the second brake B2 and the one-way clutch F1. The rotation of the carrier $CR_2$ is transmitted to the counter drive gear 21 while rotating the ring gear $R_1$ at idle.

The rotation, as transmitted from the counter drive gear 21 to the counter driven gear 22, is further transmitted to the ring gear $R_3$. However, the relative rotation between the carrier $CR_3$ and the sun gear $S_3$ is blocked by the third clutch C3 so that the third planetary gear unit 38 comes into a direct-coupled state. As a result, the rotation of the counter driven gear 22 is transmitted without speed change to the output shaft 23.

Next, at the 4th speed in the D-range, the first clutch C1, the second clutch C2, the third clutch C3 and the second brake B2 are applied. Then, the rotation of the output shaft 14 is transmitted through the first clutch C1 to the ring gear $R_2$ and through the second clutch C2 to the sun gear $S_2$ to bring the first planetary gear unit 31 and the second planetary gear unit 32 into directly-coupled states. As a result, the rotation of the output shaft 11 is transmitted without change in speed to the counter drive gear 21.

The rotation, as transmitted from the counter drive gear 21 to the counter driven gear 22, is further transmitted to the ring gear $R_3$. However, the relative rotation between the carrier $CR_3$ and the sun gear $S_3$ is blocked by the third clutch C3 so that the third planetary gear unit 38 comes into the direct-coupled state. As a result, the rotation of the counter driven gear 22 is transmitted without speed change to the output shaft 23.

The automatic transmission is provided with a hydraulic control unit 40 for establishing the individual gear stages by applying/releasing the first clutch C1, the second clutch C2, the third clutch C3, the first brake B1, the second brake B2, the third brake B3 and the fourth brake B4. The hydraulic control unit 40 is connected with the automatic transmission control unit (ECU) 41 so that they are operated according to the control program of the automatic transmission control unit 41.

The automatic transmission control unit 41 receives individual signals from a neutral start switch (N.S.S.W.) 45, an RPM sensor 47, a brake switch 48, the engine RPM sensor 49, a throttle opening sensor 50 and a vehicle speed sensor 51.

The shift position of the not-shown shift lever, i.e., the selected range, is detected by the neutral start switch 45. The RPM of the output shaft 14 (hereinafter "clutch input side RPM") $N_{C1}$, located at the input side of the first clutch C1, can be detected by the RPM sensor 47.

Whether or not the brake pedal is depressed can be detected by the brake switch 48. Engine RPM $N_E$ is detected by the engine RPM sensor 49 and throttle opening θ is detected by the throttle opening sensor 50. The RPM (hereinafter "output RPM") No at the output side of the speed change unit 16, i.e., the vehicle speed, can be detected by the vehicle speed sensor 51.

Figure 4:
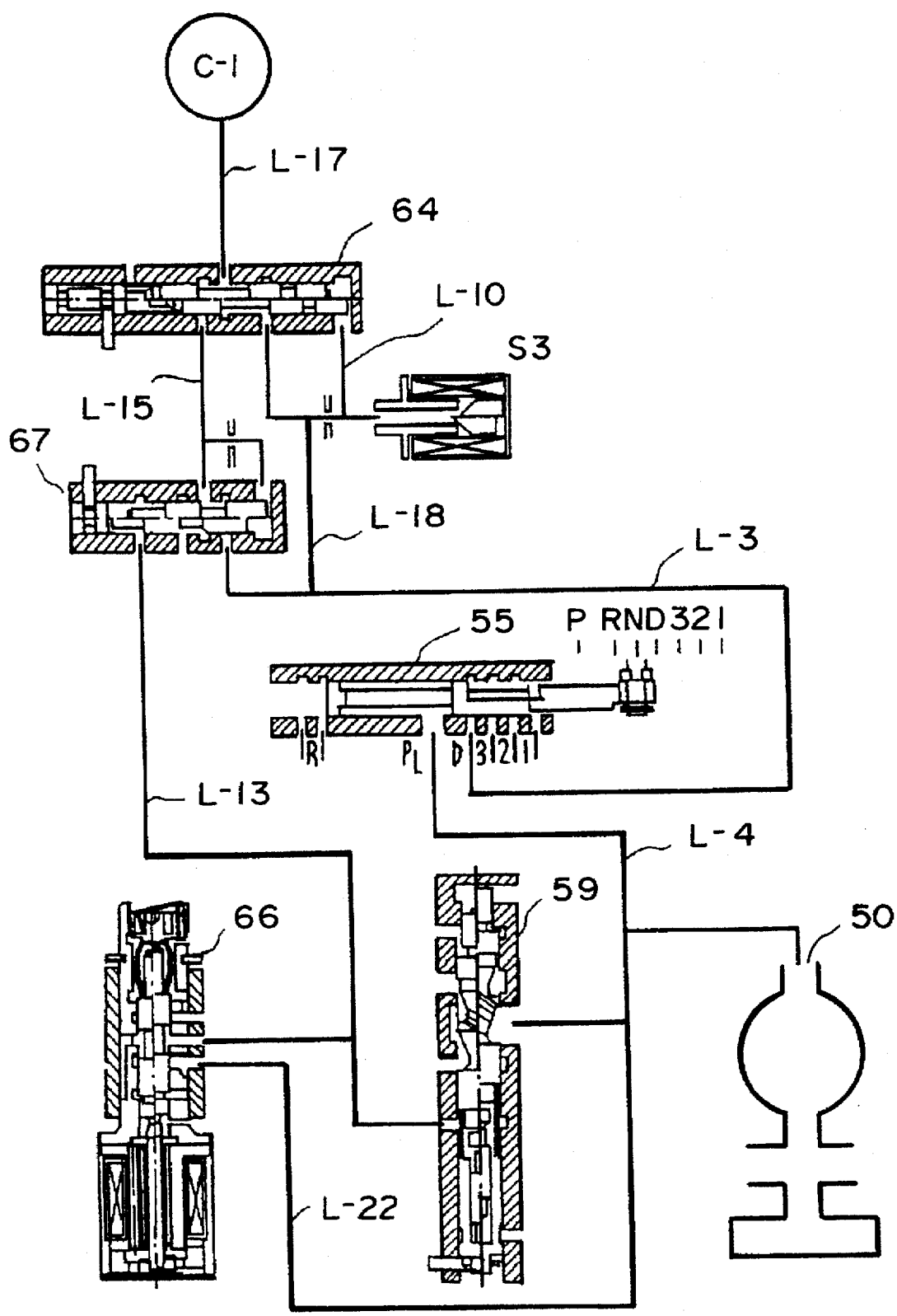
FIG. 4 is a hydraulic circuit diagram of a portion of a hydraulic control unit important to an understanding of the embodiment of FIGS. 1 and 2.

FIG. 4 is a hydraulic circuit diagram of an essential portion of the hydraulic control unit 40 in the foregoing embodiment of the present invention. As shown in FIG. 4, a primary valve 59 regulates the oil pressure coming from the a pump 50 and outputs it as a line pressure to an oil line L-4. Moreover, a manual Valve 55 is provided with ports 1, 2, 3, D, $P_L$ and R so that the line pressure, as outputted from the primary valve 59, is fed via the oil line L-4 to the port $P_L$. The manual valve 55 is connected to the shift lever (not shown), which is operated to output the line pressure as the 1st-range pressure, the 2nd-range pressure, 3rd-range pressure, the D-range pressure or the R-range pressure from the ports 1, 2, 3, D and R, respectively.

When the shift lever is placed in the D-range position, the oil at the D-range pressure, as output at the port D, is fed to the individual hydraulic servos to apply the first clutch C1 (FIG. 2), the second clutch C2, the third clutch C3, the first brake B1, the second brake B2 and the third brake B3, selectively, to thereby establish one of the gear stages.

In this case, when the vehicle speed and the throttle opening θ dictate a shift to a different gear stage, the solenoid signals corresponding to the shift are turned ON/OFF, the solenoid valves are opened/closed in response thereto, and the not-shown 1-2 shift valve, 2-3 shift valve and 3-4 shift valve are correspondingly switched.

A linear-solenoid valve 66 is provided for establishing the neutral control. This linear solenoid valve 66 is controlled in response to a signal from the hydraulic control unit 40 so that it adjusts the oil pressure, as fed from the primary valve 59 via an oil line L-22, to generate a throttle pressure $P_{TM}$. Moreover, the linear solenoid valve 66 feeds the throttle pressure $P_{TH}$ as a control oil pressure to a C-1 control valve 67 via an oil line L-13.

The C-1 control valve 67 receives with the D-range pressure via an oil line L-3 and regulates the D-range pressure to provide a C-1 oil pressure $P_{C1}$ corresponding to the throttle pressure $P_{TH}$ from the linear solenoid valve 66 and feeds $P_{C1}$ to an oil line L-15.

The oil line L-15 connects to a neutral relay valve 64 which, in turn, communicates with a hydraulic servo C-1 via an oil line L-17 and with a solenoid valve S3 via an oil line L-10. Moreover, the neutral relay valve 64 is connected with the oil line L-3 via an oil line L-18 so that it can feed the D-range pressure.

In neutral control the solenoid valve S3 is turned ON so that the neutral relay valve 64 takes the upper half position shown in FIG. 4. As a result, the C-1 oil pressure $P_{C1}$ from the oil line L-15 is fed via the oil line L-17 to the hydraulic servo C1.

In the 1st to 4th speeds, on the other hand, the solenoid valve S3 is turned OFF so that the neutral relay valve 64 takes the lower half position. As a result, the oil at the D-range pressure is fed via the oil lines L-3 and L-18, the neutral relay valve 64 and the oil line L-17 to the hydraulic servo C-1.

In this embodiment, the neutral relay valve 64, the linear solenoid valve 66, the C-1 control valve 67 and the hydraulic servo C-1 thus far described constitute the hydraulic control means 103 (FIG. 1).

In this embodiment, if the vehicle stop state is detected by confirmation that the forward running range is selected, that the throttle opening θ is fully closed, that the brake pedal is depressed and that the vehicle speed is substantially zero, the neutral control is executed by the automatic transmission control unit 41.

In neutral control, the throttle pressure $P_{TH}$ is gradually lowered to effect the sweep-down, and the pressure is then repeatedly lowered and raised as necessary to hold the released state of the first clutch C1. When the vehicle stop state is not detected, the throttle pressure $P_{TH}$ is gradually raised.

Figure 5:
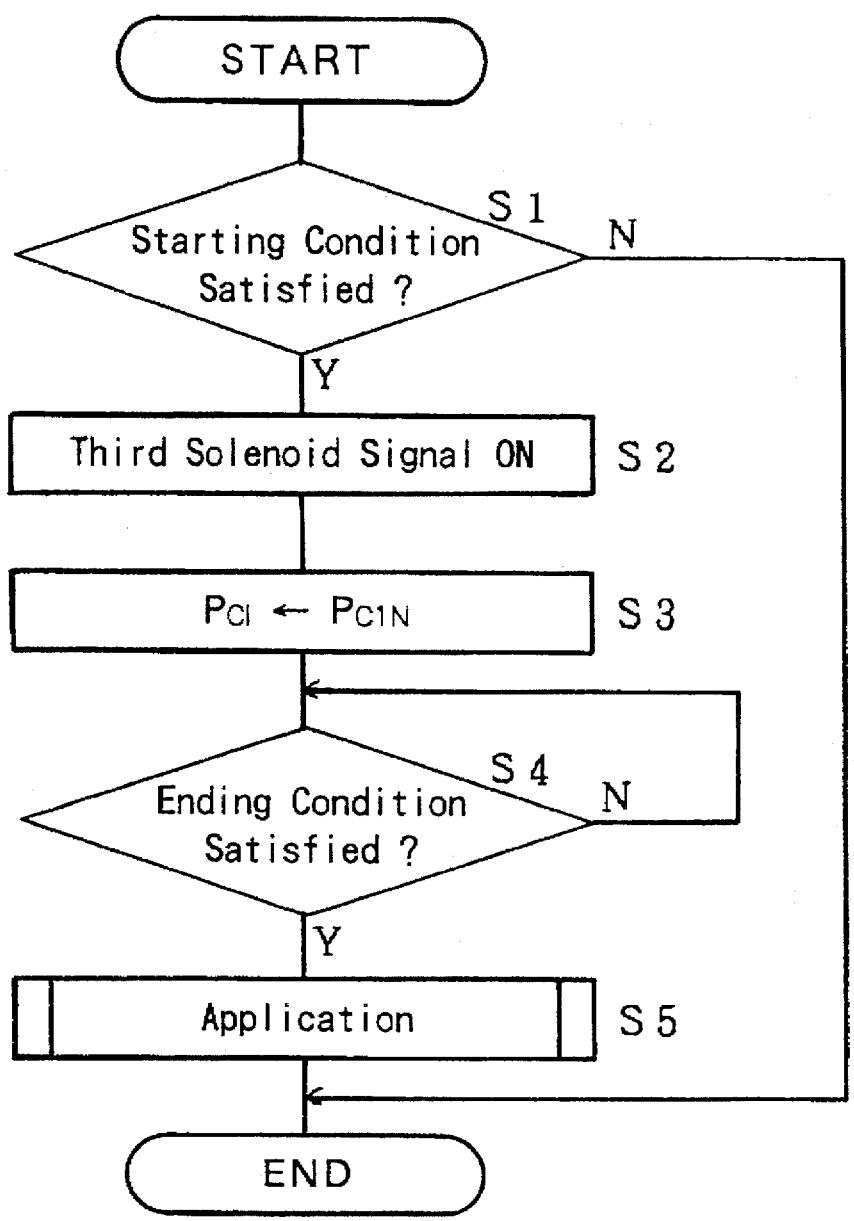
FIG. 5 is a flow chart of the control operations (main routine) of the control system of the embodiment of FIGS. 1 and 2.

FIG. 5 is a flow chart illustrating the operations of the control system of the foregoing embodiment wherein:

Step S1: Stop state detecting means in the automatic transmission control unit 41 (FIG. 2) decides whether or not the condition for starting the neutral control is satisfied. The routine advances to Step $S_2$, if the starting condition is satisfied, but is ended if NOT.

The starting condition holds if the vehicle stop state is detected by confirming satisfaction of all of the following conditions: that the engine 10 is in the idling state, that the throttle opening θ is fully closed, that the brake pedal is depressed, i.e. that the brake switch 48 is ON, that the D-range is selected by the position of the shift lever, and that the vehicle speed is not higher than a set value, i.e., substantially zero.

Step S2: A third solenoid signal for opening/closing the solenoid valve $S_3$ (FIG. 4) is turned ON.

Step S3: The stop oil pressure generating means in the automatic transmission control unit 41 generates a stop oil pressure $P_{C1N}$ and sets it at the C-1 oil pressure $P_{C1}$ so that the first clutch C1 can be placed in the state which immediately precedes start of its engagement. For this purpose, the throttle pressure $P_{TH}$ is gradually lowered to effect the sweep-down and is then repeatedly lowered and raised as necessary to maintain the C-1 oil pressure $P_{C1}$ to the stop oil pressure $P_{C1N}$. Thus, the first clutch C1 is held in the released state so that it can be placed in the state immediately before the start of engagement.

Step S4: The satisfaction of the condition for ending the neutral control is awaited, i.e. satisfaction of any of the following conditions: that the throttle opening θ is not fully closed; that the brake switch 48 is OFF; that the D-range is not selected; and the vehicle speed is above the set value, i.e. not substantially zero. Thus, it is decided that the condition for ending the neutral control is satisfied when the vehicle starting condition is detected, but the vehicle stopping condition is not.

Step S5: The clutch application subroutine is executed.

Figure 6:
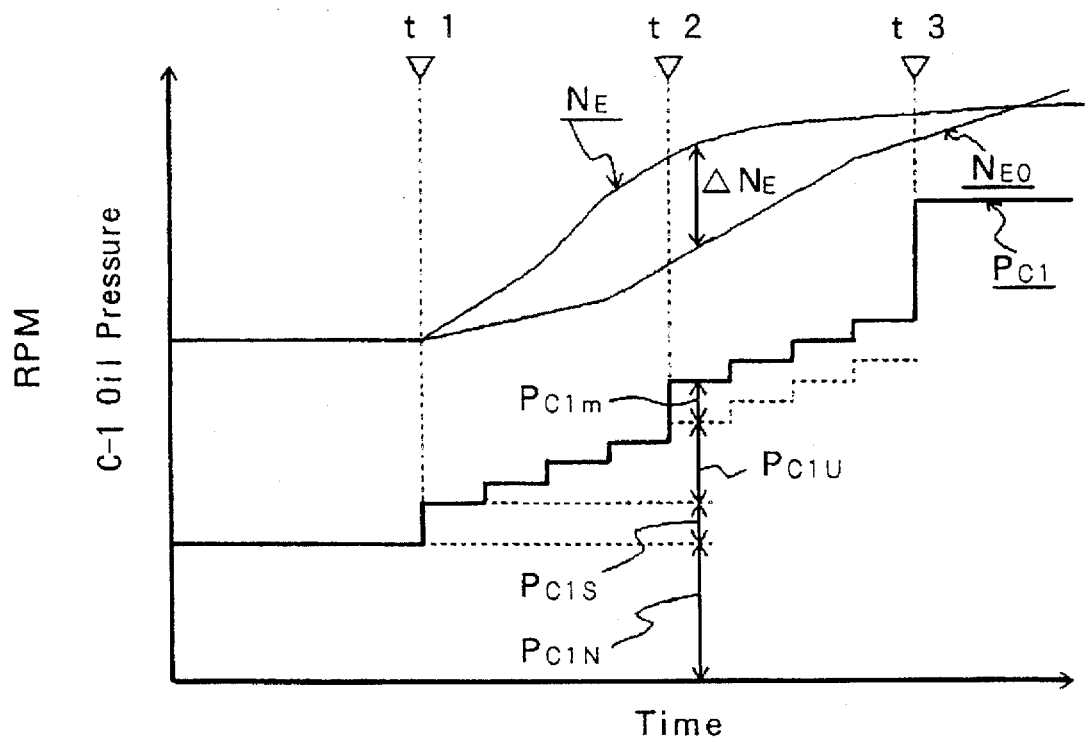
FIG. 6 is a time chart for the main routine of FIG. 5.

FIG. 6 is a time chart for the application subroutine of Step S5 wherein the abscissa indicates the time, and the ordinate indicates the RPM and the C-1 oil pressure $P_{C1}$.

In FIG. 6: $N_E$ designates the actual engine RPM, as detected by the engine RPM sensor 49 (FIG. 2); $N_{EO}$ is an ideal engine RPM; $\Delta N_E$ is the difference in rotational speed between the actual engine RPM $N_E$ and the ideal engine RPM $N_{EO}$; and $P_{C1}$ is the C-1 oil pressure fed to the hydraulic servo C-1.

As illustrated, application of the clutch is started at time t1. If the accelerator pedal is depressed, for example, the actual engine RPM $N_E$ rises with lapse of time from the idling RPM.

At time t1 when application is started, the C-1 oil pressure $P_{C1}$ is the sum of the stop oil pressure $P_{C1N}$ controlled at Step S3 and an initial engaging pressure $P_{C1s}$. $P_{C1}$ is thereafter swept up with the lapse of time so that it is gradually raised. For this, the sweep-up pressure $P_{C1u}$ is added to the sum of the stop oil pressure $P_{C1N}$ and the initial engaging pressure $P_{C1s}$.

The actual engine RPM $N_E$, as detected by the engine RPM sensor 49, rises faster than the ideal engine RPM $N_{EO}$ which is required for achieving the ideal engaging characteristics of the first clutch C1. As a result, there is a rotational difference $\Delta N_E$ between the actual engine RPM $N_E$ and the ideal engine RPM $N_{EO}$.

Over a constant time period the rotational difference $\Delta N_E$ increases with time so that the engaging characteristics of the first clutch C1 deviate from the ideal. If the rotational difference $\Delta N_E$ exceeds a set value δ at time t2, the oil pressure correction $P_{C1m}$ corresponding to the rotational difference $\Delta N_E$ is issued and is further added to the sum of the stop oil pressure $P_{C1N}$, the initial engaging pressure $P_{C1s}$ and the sweep-up pressure $P_{C1u}$.

Thus, the C-1 oil pressure $P_{C1}$ is first gradually raised and is then abruptly raised when the hydraulic servo C-1 becomes filled with oil at time t3.

As a result, even if an error occurs in the output of the control valve of the hydraulic control means 103 (FIG. 1) or if aging occurs in the first clutch C1, the oil pressure is corrected by the oil pressure correction increment $P_{C1m}$ according to the rotational difference $\Delta N_E$ between the actual engine RPM $N_E$ and the ideal engine RPM $N_{EO}$, so that the engaging characteristics obtained can approximate the ideal ones. As a result, it is possible to prevent racing of the engine 10 and application shock.

By use of the characteristic storing means which contains oil pressure data for the ideal engaging characteristics of the first clutch C1, the difference between the ideal engaging characteristics and the actual engaging characteristics can be minimized. This makes it possible to set the oil pressure correction increment $P_{C1m}$ at a small value and to improve the follow-up and the convergence.

Moreover, since the applied/released state of the first clutch C1 is detected in terms of the actual engine RPM $N_E$, detection can be facilitated thus improving controllability.

Figure 7:
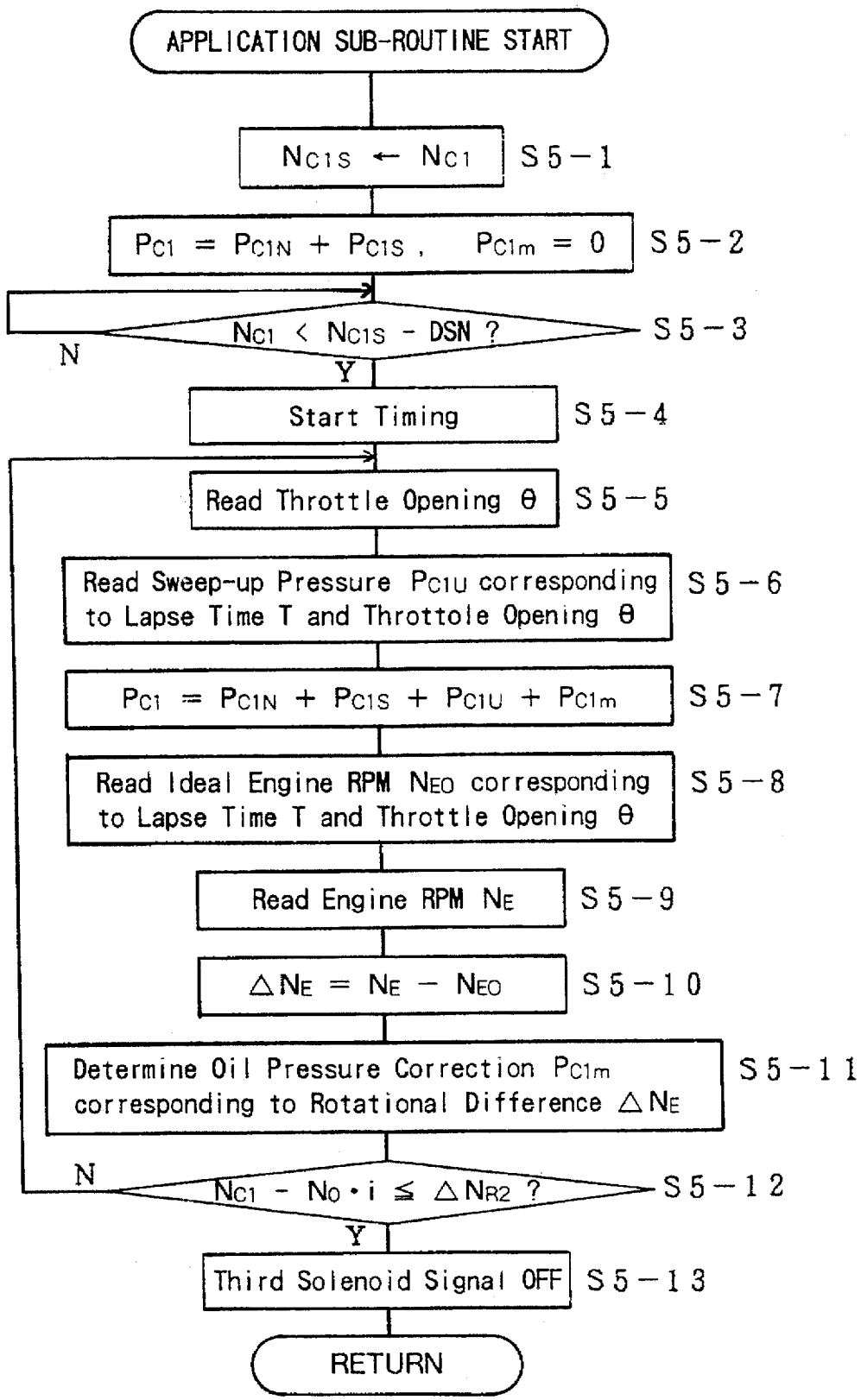
FIG. 7 is a flow chart for a sub-routine for the application step S5 in FIG. 5.

FIG. 7 is a flow chart for the subroutine of step S5 in FIG. 5 wherein:

Step S5-1: The clutch input side RPM $N_{C1}$ at the instant when the condition for ending the neutral control is satisfied is set to a value $N_{C1s}$.

Step S5-2: The initial engaging pressure $P_{C1s}$ (the shelf pressure) is added to the stop oil pressure $P_{C1N}$ as the base pressure, and the sum is used as the C-1 oil pressure $P_{C1}$. Incidentally, the initial engaging pressure $P_{C1s}$ is generated by initial engaging pressure generating means in the automatic transmission control unit (FIG. 2) and can be set to a value sufficient to move the not-shown piston of the hydraulic servo C-1 (FIG. 4) yet not so high as to cause application shock upon engagement. At this time, moreover, the oil pressure correction value $P_{C1m}$ is zero.

In the case of the neutral control, the first clutch C1 is held in the state immediately before the start of its engagement so that the piston of the hydraulic servo C-1 is placed in a slightly retracted position. If the C-1 oil pressure $P_{C1}$ is raised from that state, the piston is prevented from instantly moving by the starting (frictional) resistance.

In the present embodiment, when the vehicle starting state is detected, the initial engaging pressure $P_{C1s}$ is added to the sweep-up pressure $P_{C1u}$, and this sum is output to the hydraulic control means 103 (FIG. 1) so that the piston can be moved against the aforementioned starting resistance. As a result, the engaging time can be shortened.

Step S5-3: The subroutine waits until the clutch input side RPM $N_{C1}$ becomes smaller than the difference obtained by subtracting the value $N_{C1s}$ from a constant DSN.

Step S5-4: The timing operation of the timer is started.

Step S5-5: The automatic transmission control unit 41 reads the throttle opening θ which is detected by the throttle opening sensor 50.

Figure 8:
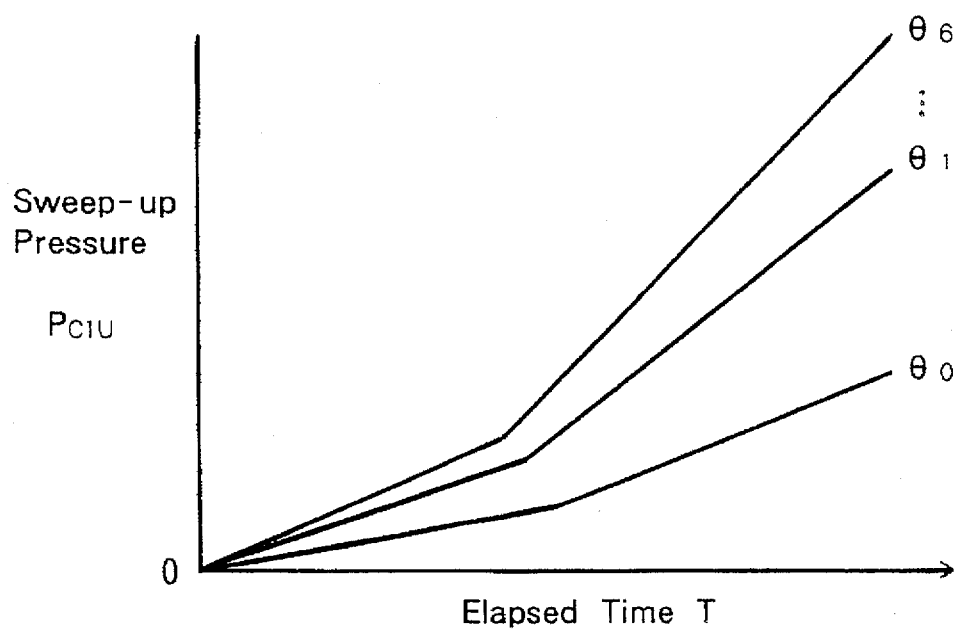
FIG. 8 is a graph presenting a map of a sweep-up pressure in the embodiment of the foregoing FIGS.

Step S5-6: The hydraulic command means 109 reads the sweep-up pressure $P_{C1U}$ for sweeping up the C-1 oil pressure $P_{C1}$, with reference to the map of FIG. 8, which is stored in the characteristic storing means 105. The sweep-up pressure $P_{C1u}$ is set to correspond to the elapsed time T, as measured by the timer, and the throttle opening θ.

Step S5-7: The hydraulic command means 109 sets the C-1 oil pressure $P_{C1}$ by adding the initial engaging pressure $P_{C1s}$, the sweep-up pressure $P_{C1u}$ and the oil pressure correction $P_{C1m}$ to the stop oil pressure $P_{C1N}$, and outputs the sum to the hydraulic control means 103.

Figure 9:
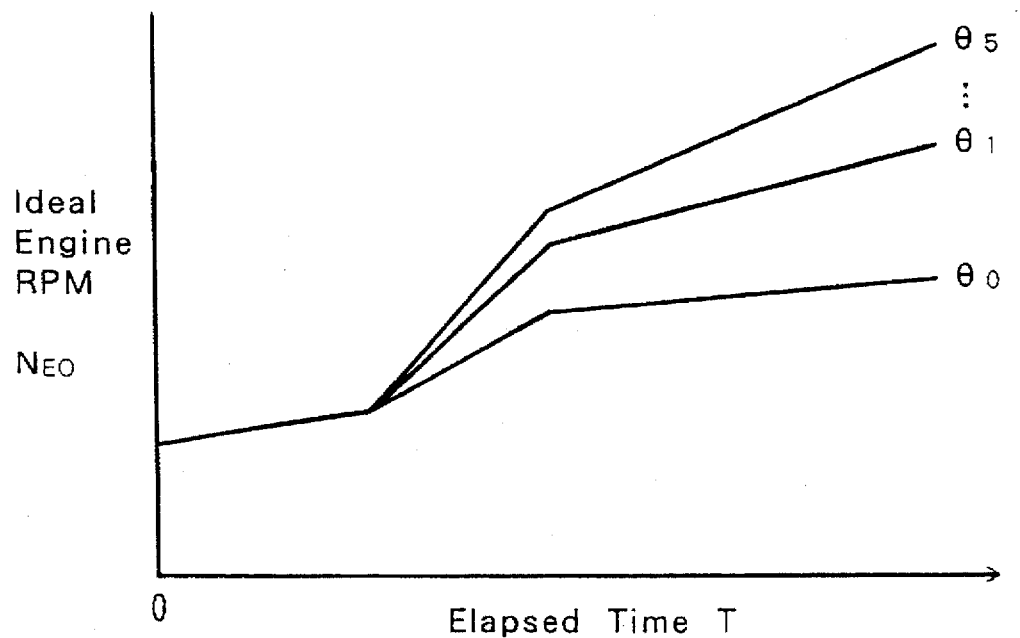
FIG. 9 is a graph presenting a map of an ideal engine RPM in the embodiment of the foregoing FIGS.

Step S5-8: The correction setting means 108 reads the ideal engine RPM $N_{EO}$ corresponding to the elapsed time T, as measured by the timer, and the throttle opening θ with reference to the map of FIG. 9, as stored in the applied/released state characteristic storing means 106.

Figure 10:
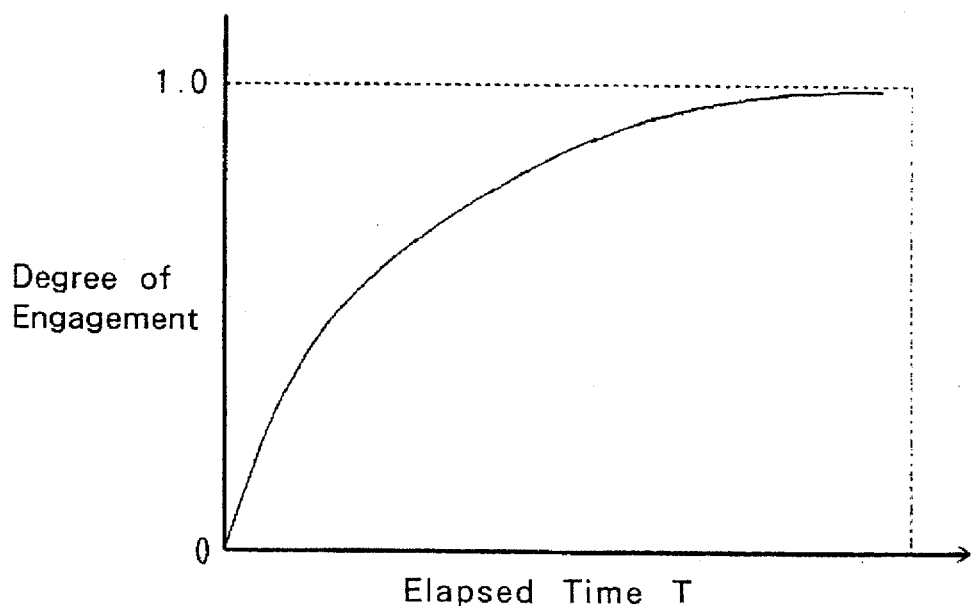
FIG. 10 is a graph presenting an engaging characteristic diagram of a first clutch in the embodiment of the foregoing FIGS.
Figure 11:
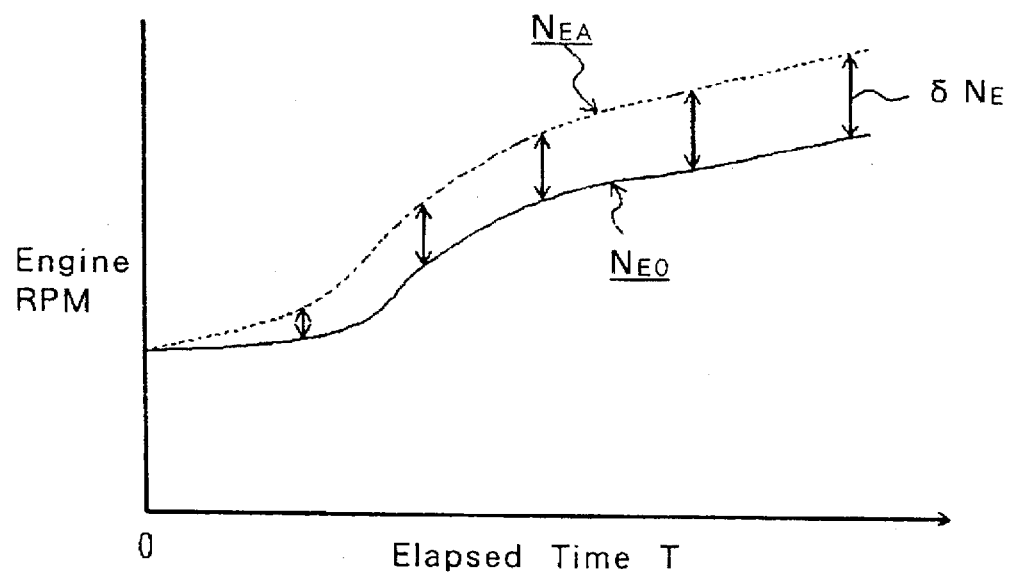
FIG. 11 is a graph of engine RPM (ordinate) verses elapsed time T (abscissa) characteristic of the embodiment of the present invention.

In FIG. 11, $N_{EA}$ designates engine RPM in the case where the engine 10 is driven with a constant throttle opening θ but without exerting any load. This engine RPM value $N_{EA}$ is lowered by the value $\delta N_E$ which is determined by the characteristics of the torque converter 12 and the degree of engagement of the first clutch C1, when the engine 10 and the first clutch C1 are connected through the torque converter 12, so that the first clutch C1 may be applied with the engaging characteristics, as illustrated in FIG. 10.

Hence, the value which is obtained by subtracting $\delta N_E$ from the engine RPM $N_{EA}$ is Set to the ideal engine RPM $N_{EO}$.

Step S5-9: The correction setting means 108 reads the actual engine RPM $N_E$ which is detected by the engine RPM sensor 49.

Step S5-10: The correction setting means 108 decides the rotational difference $\Delta N_E$ by subtracting the ideal engine RPM $N_{EO}$ from the actual engine RPM $N_E$.

Figure 12:
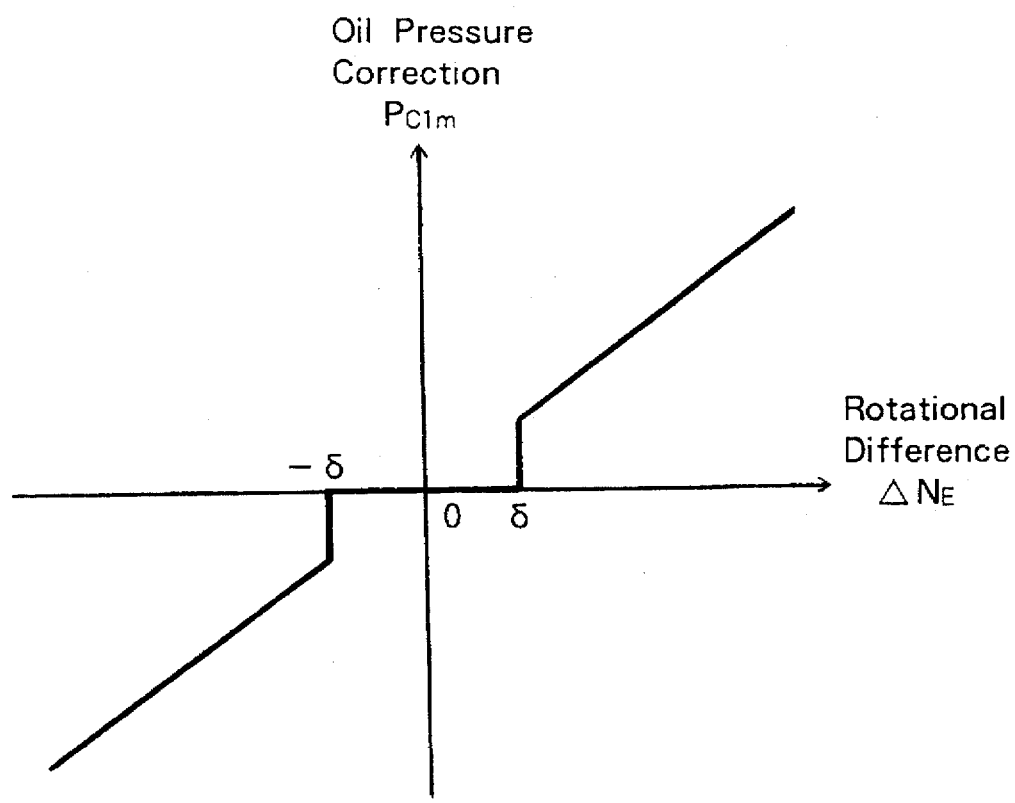
FIG. 12 is a graph of the oil pressure correction factor (ordinate) versus rotational difference $\Delta N_E$ in the embodiment of the present invention.

Step S5-11: The correction setting means 108 determines the oil pressure correction $P_{C1m}$ corresponding to the rotational difference $\Delta N_E$, with reference to FIG. 12. In this case, the oil pressure correction $P_{C1m}$ is set to zero if the rotational difference $\Delta N_E$ is smaller than the set value δ.

Hence, it is possible to prevent the C-1 oil pressure $P_{C1}$, which is fed to the hydraulic servo C-1, from unnecessarily fluctuating by addition of the oil pressure correction $P_{C1m}$. Since the set value δ is determined according to the detection accuracy of the engine RPM sensor 49, the oil pressure correction $P_{C1m}$ need not be uselessly issued so that the time period necessary for the application can be shortened.

Step S5-12: It is decided whether or not the application of the first clutch C1 is ended. The routine advances to Step S5-13, if the application is ended, but returns to Step S5-5 if the application is not ended. In this case, whether or not the application of the first clutch C1 is ended is decided by multiplying the output RPM $N_O$, as detected by the vehicle speed sensor 51, and the gear ratio i of the speed change unit 16 to calculate the value No·i and by comparing the difference which is obtained by subtracting the value No·i from the clutch input side RPM $N_{C1}$, with a set value $\Delta N_{R2}$. It is decided that the application of the first clutch C1 has ended, if the following is satisfied:

$$N_{C1} - No \cdot i \leq N_{R2}.$$

Step S5-13: The third solenoid valve is turned OFF.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission which receives rotation from an engine mounted in a vehicle, comprising:

a clutch for transmitting the rotation of the engine to the transmission;

a hydraulic servo for applying/releasing said clutch;

starting state detecting means for detecting, as a vehicle starting condition, at least one of the following conditions: that a throttle is at least partially open; that a brake pedal is released; and that the vehicle is in motion;

throttle opening detecting means for detecting the throttle opening of the engine;

applied/released state detecting means for detecting the applied/released state of said clutch;

hydraulic control means for controlling the oil pressure fed to said hydraulic servo; and a control unit, said control unit including:

a timer for measuring an elapsed time from the initiation of a control of engagement of said clutch;

characteristic storing means containing engagement characteristic data in the form of oil pressures for achieving ideal engaging characteristics for said clutch, correlated with data for elapsed time and the throttle opening;

applied/released state characteristic storing means containing data for applied/released parameters of said clutch corresponding to the ideal engaging characteristics, correlated with elapsed time and the throttle opening;

correction setting means for setting an oil pressure correction according to a difference between the actual applied/released state of said clutch, as detected by said applied/released state detecting means, and the ideal applied/released state, as read out from said applied/released state characteristic storing means; and hydraulic command means for reading out the oil pressure from said characteristic storing means, responsive to detection of said vehicle starting condition, and for adding said oil pressure correction to said read oil pressure.

2. A control system for an automatic transmission according to claim 1, wherein the applied/released state of said clutch is detected in terms of an engine RPM by said applied/released state detecting means, and wherein the data for applied/released parameters contained in said applied/released state characteristic storing means is data for engine RPM providing ideal applied/released states, correlated with elapsed time and throttle opening.

3. A control system for an automatic transmission according to claim 1, wherein said control unit further includes:

stop state detecting means for detecting, as a vehicle stop state, satisfaction of the following conditions: a forward running range is selected, the throttle is fully closed, the brake pedal is depressed and the vehicle speed is substantially zero; and stop oil pressure generating means for generating a stop oil pressure to hold said clutch in the state which immediately precedes start of its engagement, responsive to detection of said vehicle stop state, and wherein said hydraulic command means reads out the oil pressure from said characteristic storing means, responsive to the detection of a vehicle starting condition, and adds said stop oil pressure to said read oil pressure.

4. A control system for an automatic transmission according to claim 3, wherein said control unit further includes initial engaging pressure generating means for generating an initial engaging pressure, and wherein said hydraulic command means outputs the sum of said read oil pressure, said stop oil pressure, said initial engaging pressure and said oil pressure correction to said hydraulic control means.

5. A control system for an automatic transmission according to claim 1, wherein said correction setting means sets said oil pressure correction to zero if the difference between said actual applied/released state and said ideal applied/released state is smaller than a predetermined value.

* * * * *

UNITED STATES PATENT AND TRADEMARK OFFICE
CERTIFICATE OF CORRECTION

PATENT NO. : 5,690,581
DATED : November 25, 1997
INVENTOR(S) : NADAYOSHI et al

It is certified that error appears in the above-indentified patent and that said Letters Patent is hereby corrected as shown below:

Col. 5, line 49, delete "clutch", first instance.

Col. 6, line 26, "$S_1$" should read --$S_3$--; and
line 56, delete "B".

Col. 8, line 2, "No" should read --$N_o$--;
line 9, delete "the", first instance;
line 10, "Valve" should read --valve--; and
line 35, "$P_{TM}$" should read --$P_{TH}$--.

Col. 11, line 35, "Set" should read --set--.

Signed and Sealed this

Twenty-seventh Day of October, 1998

Attest:

BRUCE LEHMAN

*Attesting Officer*         *Commissioner of Patents and Trademarks*